US012258911B2

(12) United States Patent
Lee et al.

(10) Patent No.: US 12,258,911 B2
(45) Date of Patent: Mar. 25, 2025

(54) FUEL UNIT HEALTH MONITORING SYSTEM

(71) Applicants: Rolls-Royce Corporation, Indianapolis, IN (US); Rolls-Royce North American Technologies Inc., Indianapolis, IN (US)

(72) Inventors: Andrew Lee, Indianapolis, IN (US); Mihir Desai, Yorba Linda, CA (US); Govindaraj Kalyanasamy, Indianapolis, IN (US); Mark Collett, Derby (GB)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 18/453,017

(22) Filed: Aug. 21, 2023

(65) Prior Publication Data
US 2025/0067222 A1 Feb. 27, 2025

(51) Int. Cl.
F02C 9/26 (2006.01)
F02C 7/22 (2006.01)
F02C 7/26 (2006.01)
F02C 9/28 (2006.01)

(52) U.S. Cl.
CPC ............... *F02C 9/263* (2013.01); *F02C 7/26* (2013.01); *F02C 9/28* (2013.01); *F02C 7/22* (2013.01)

(58) Field of Classification Search
CPC .... F02C 9/263; F02C 9/28; F02C 7/22; F02C 7/222; F02C 7/232; F01D 21/003; G01M 15/14; F05D 2260/80; F05D 2260/83
See application file for complete search history.

(56) References Cited

U.S. PATENT DOCUMENTS 2,670,598 A 3/1954 Van Millingen
3,444,875 A 5/1969 Furlong et al.
(Continued)

FOREIGN PATENT DOCUMENTS

EP 1 138 933 A2 10/2001
EP 1 380 796 A2 1/2004
JP H 11108712 A 4/1999

OTHER PUBLICATIONS

U.S. Appl. No. 18/453,069, filed Aug. 21, 2023, naming inventors Kalyanasamy et al.
(Continued)

*Primary Examiner* — Alain Chau
(74) *Attorney, Agent, or Firm* — Shumaker & Sieffert, P.A.

(57) ABSTRACT

A method of monitoring a fuel system in a gas turbine engine. The method may comprise pumping fuel to a combustor from a fuel tank with a pump. The method may comprise controlling a flow of the fuel to the combustor with a metering valve disposed downstream of the pump and closing a spill valve disposed downstream of the pump, wherein the spill valve is closed in fixed increments and closing the spill valve increases a pressure in the fuel system. The method may comprise opening a pressure valve in response to the pressure in the fuel system being equal to or greater than a predetermined value, and capturing a degree of closing of the spill valve when the pressure valve opens.

14 Claims, 4 Drawing Sheets

(56) References Cited

U.S. PATENT DOCUMENTS

| | | | | |
|---|---|---|---|---|
| 3,808,801 | A | * | 5/1974 | Taylor ............... F02C 9/263 60/39.281 |
| 4,987,737 | A | * | 1/1991 | Cantwell ............ F01D 21/02 60/39.281 |
| 5,012,840 | A | | 5/1991 | Betzler |
| 5,111,653 | A | | 5/1992 | Leeson |
| 5,563,351 | A | | 10/1996 | Miller |
| 5,817,950 | A | | 10/1998 | Wiklund et al. |
| 6,176,076 | B1 | | 1/2001 | Ford |
| 6,684,163 | B2 | | 1/2004 | Antoine et al. |
| 7,204,076 | B2 | | 4/2007 | Griffiths et al. |
| 7,481,102 | B2 | * | 1/2009 | Bickley ............ F02C 9/263 73/114.41 |
| 7,845,177 | B2 | | 12/2010 | Parsons |
| 8,528,420 | B2 | | 9/2013 | Benson et al. |
| 8,601,822 | B2 | | 12/2013 | Paradise |
| 8,839,769 | B2 | | 9/2014 | Sasai et al. |
| 8,919,094 | B2 | | 12/2014 | Haugsjaahabink |
| 8,991,186 | B2 | * | 3/2015 | Bickley ............... F02C 9/46 60/233 |
| 9,309,882 | B2 | * | 4/2016 | Potel ................. G01D 5/2291 |
| 9,435,267 | B2 | | 9/2016 | Myer et al. |
| 9,546,628 | B2 | | 1/2017 | Sanborn et al. |
| 9,771,906 | B2 | * | 9/2017 | Henson ............ F02C 7/236 |
| 9,790,864 | B2 | | 10/2017 | Skertic et al. |
| 10,428,744 | B2 | | 10/2019 | Veilleux |
| 10,443,512 | B2 | | 10/2019 | Syed et al. |
| 11,513,033 | B2 | | 11/2022 | Lee |
| 2001/0052338 | A1 | * | 12/2001 | Yates ................. F02M 37/04 73/114.38 |
| 2005/0111988 | A1 | * | 5/2005 | Griffiths ............ F04B 51/00 417/53 |
| 2007/0107435 | A1 | * | 5/2007 | Bickley ............. F02C 7/236 60/773 |
| 2010/0115959 | A1 | | 5/2010 | Anson et al. |
| 2010/0305880 | A1 | | 12/2010 | Oddie |
| 2011/0146823 | A1 | * | 6/2011 | Griffiths ............. F02C 9/32 137/625.48 |
| 2012/0210716 | A1 | | 8/2012 | Weir et al. |
| 2012/0219429 | A1 | | 8/2012 | Heitz |
| 2012/0227707 | A1 | | 9/2012 | Sasai et al. |
| 2013/0036738 | A1 | | 2/2013 | Pora |
| 2014/0373611 | A1 | * | 12/2014 | Potel ................. F04B 51/00 73/112.03 |
| 2015/0027412 | A1 | | 1/2015 | Henson |
| 2017/0227424 | A1 | * | 8/2017 | Martucci ............ F02C 7/232 |
| 2018/0030898 | A1 | * | 2/2018 | Emmons ............ F02C 7/22 |
| 2018/0163966 | A1 | | 6/2018 | Jones et al. |
| 2018/0320599 | A1 | | 11/2018 | Krynski et al. |
| 2020/0116084 | A1 | * | 4/2020 | Pye .................. F02C 7/232 |
| 2020/0271547 | A1 | * | 8/2020 | Lee ................... G01M 15/14 |
| 2024/0026825 | A1 | * | 1/2024 | Susca ............... F02C 7/232 |

OTHER PUBLICATIONS

Search Report from counterpart British Application No. GB2410912.6 dated Jan. 22, 2025, 3 pp.

* cited by examiner

FUEL UNIT HEALTH MONITORING SYSTEM

TECHNICAL FIELD

This disclosure relates to gas turbine engines and, in particular, to monitoring the health of a fuel pump and metering unit of a gas turbine engine.

BACKGROUND

Present fuel management systems, such as fuel pump and metering systems, suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
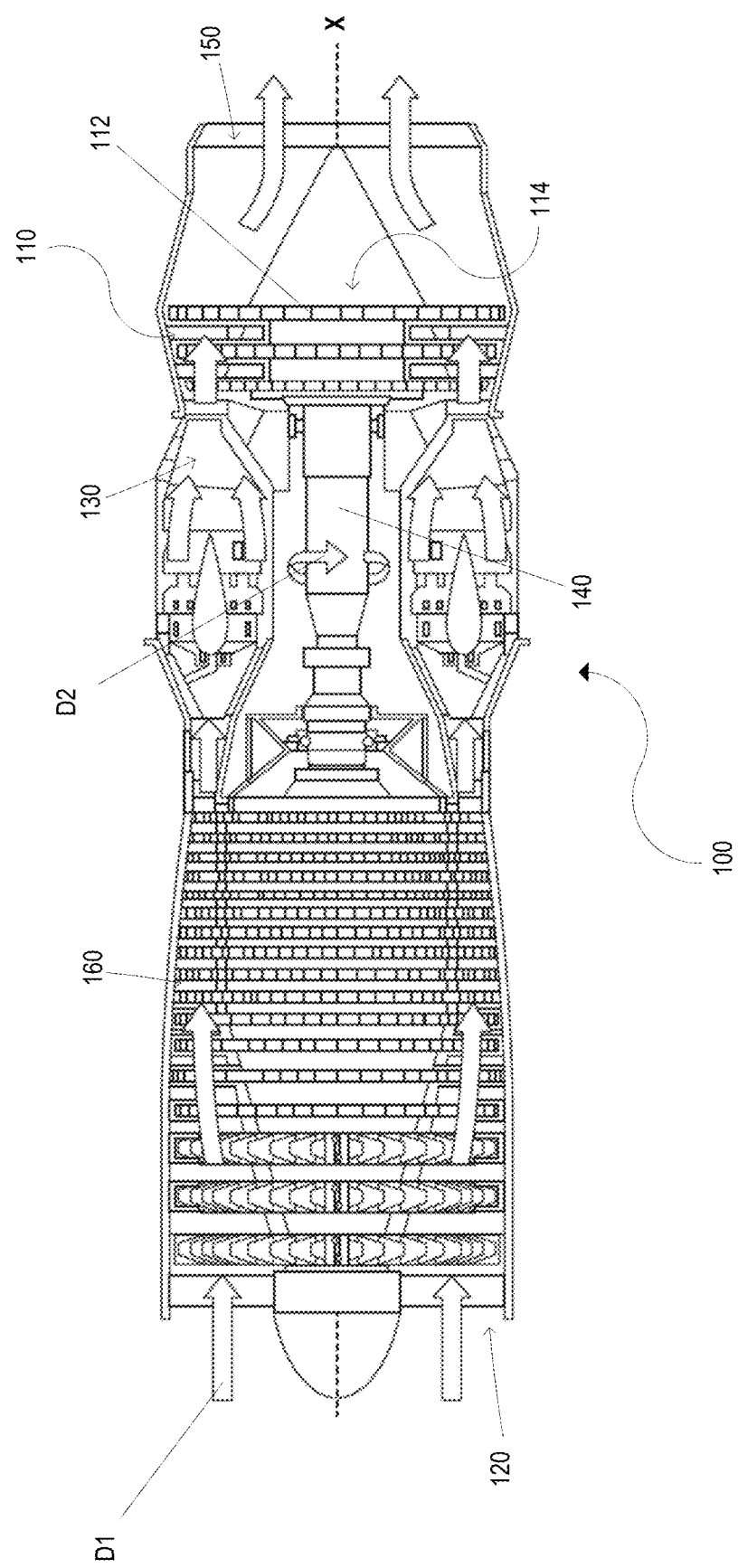
FIG. 1 illustrates a cross-sectional view of an example of a gas turbine engine.

A method of monitoring a fuel system in a gas turbine engine may comprise pumping fuel to a combustor from a fuel tank with a pump and controlling a flow of the fuel to the combustor with a metering valve. The metering valve may be disposed downstream of the pump. The method may comprise closing a spill valve disposed downstream of the pump. The spill valve may be closed in fixed increments. Closing the spill valve may increase a pressure in the fuel system. The method may comprise opening a pressure valve in response to the pressure in the fuel system being equal to or greater than a predetermined value. The method may comprise capturing a degree of closing of the spill valve when the pressure valve opens.

The method may comprise positioning a primary spill valve in a closed position. The primary spill valve may be disposed downstream of the pump. The method may comprise positioning a secondary spill valve in an open position. The secondary spill valve may be disposed downstream of the pump. The method may comprise closing the secondary spill valve in fixed increments. Closing the secondary spill valve increases a pressure in the fuel system. The method may comprise opening a pressure valve disposed downstream of the metering valve when the pressure in the fuel system reaches or exceeds a predetermined pressure value.

The method may comprise pumping fuel to the combustor from the fuel tank with the pump at a startup of a gas turbine engine. The method may comprise monitoring a degree of closing of the spill valve required to increase the pressure of the system to the predetermined pressure value. The method may comprise storing the degree of closing required in a memory and comparing respective degrees of closing from a plurality of engine startups over a period of time. The method may comprise determining a health of the pump based on the compared degrees of closing.

One interesting feature of the systems and methods described below may be that a deterioration in health of the fuel system or a component of the fuel system may be detected. In the system and methods described herein, by comparing a position and/or degree of opening of the spill valve at which the pressure in the fuel system is equal to or greater than a predetermined or set value, or in other words, at which the pressure valve cracks open, a deterioration of the health of the system can be detected.

Another interesting feature of the system may be that a controller may monitor and/or capture the degree of opening of the spill valve at which the pressure valve cracks each time the gas starts up for operation. The controller may capture the degree of opening for each start up across multiple start ups over a certain period of time or certain number of start ups. The controller may compare the degrees of openings from each of the start ups and detect when the degree of opening has changed significantly enough to indicate deterioration of the health of the system. The controller may cause an alert or service signal once detection of predetermined threshold of deterioration occurs. The deterioration of the system may be detected, for example, before performance of the fuel system is substantially affected (e.g loss of altitude relight). This earlier detection may, for example, alert for servicing and prevent a deterioration of performance and/or an excessive usage of fuel system. Additionally, the below described methods and systems may be more reliable and/or robust than, for example, relying on a pressure sensor to detect deterioration of the system or fuel pump.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

Figure 2:
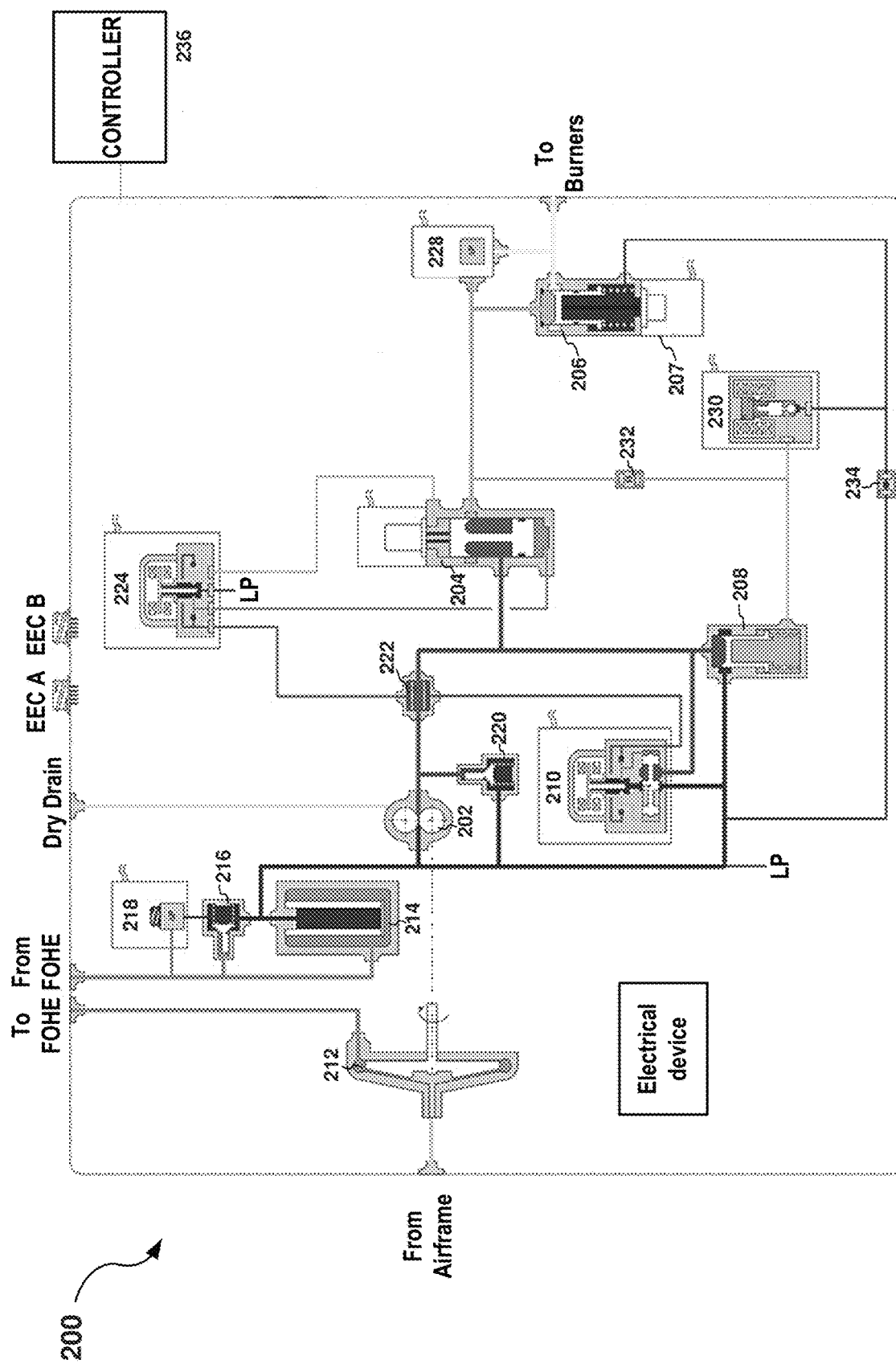
FIG. 2 illustrates a schematic of an example of a fuel pump and metering unit (FPMU)

FIG. 2 illustrates an example of a fuel pump and metering unit (FPMU) 200, which may also be referred to as a fuel system 200. The FPMU may be included in the gas turbine engine 100 of FIG. 1 and may control a flow of fuel to, for example, the combustion section 130. The FPMU 200 may control the flow of fuel from a fuel source, such as fuel tanks, to combustors and/or burners The FPMU 200 may include a pump 202, a metering valve 204, a pressure valve 206, a spill valve 208, and a secondary spill valve 210. The FPMU may also include a second pump 212, a fuel filter 214, a filter bypass valve 216, a filter transducer 218, a pressure relief valve 220, a flow filter 222, a metering servo valve 224, a pressure transducer 228, an inductive probe 207, a shutoff valve 230, a pull-down orifice 232, a back-pressure orifice 234, and a controller 236.

The FPMU 200 may be in communication with the aircraft frame, or air frame, a fuel oil heat exchanger (FOHE), a controller, an electronic engine controls, a dry drain, and/or the combustion section 130, for example, burners of the combustion section 130.

The pump 202 may be any pump capable of pumping a fluid through the FPMU 200. The pump 202, for example, may be a positive displacement pump such as a rotary or reciprocating pump. The pump 202 may be, for example a gear pump. The pump 202 may be in fluid communication with a fuel source. The pump 202 may be in fluid communication with the FOHE. The pump 202 may be downstream of the FOHE, the filter transducer 218, the filter bypass valve 216, and/or the fuel filter 214. Downstream or upstream refers to the direction of flow fuel traveling through the FPMU during operation of the FPMU, for example, in the direction of flow as the fuel flows from the FOHE to the burners. Additionally or alternatively, the pump 202 may be downstream of the pressure relief valve 220, the spill valve 208, the secondary spill valve 210, the pressure valve 206, the shutoff valve 230, and/or the back pressure orifice 234. The pump 202 may be upstream and/or in fluid communication with the metering valve 204, the flow filter 222, the pressure relief valve 220, the spill valve 208, and/or the secondary spill valve 210.

The metering valve 204 may be any device capable of controlling and/or altering the flow of fuel through the FPMU 200. The metering valve 204 may be, for example, a cylinder and piston style valve, but could be any type of valve capable of regulating fluid flow. The metering valve 204 may include, be connected to, and/or be in communication with a linear variable differential transformer (LVDT) or other component capable of controlling, detecting, and/or communicating a position of the metering valve 204, for example, how open or closed the metering valve is and/or how much flow the metering valve 204 is allowing to flow through to downstream of the metering valve 204.

The metering valve 204 may be in fluid communication with and/or downstream of the pump 202 and/or the flow filter 222. The metering valve 204 may be in fluid communication with and upstream of the pressure valve 206, the shutoff valve 230, the pull down orifice 232, and/or the spill valve 208. Additionally or alternatively, the metering valve 204 may be in communication with the metering servo valve 224. The metering servo valve 224 may control and/or otherwise communicate with the metering valve 204. The metering servo valve 224 may, for example, be in communication with the controller 236. The metering servo valve 224 may be any component capable of communicating with the controller 236 and metering valve 204, and controlling the metering valve 204. The invention described herein does not depend on the implementation of the metering valve architecture. For example, a stepper motor driven direct acting metering valve is equally feasible in the spirit of this invention without any compromise of functionality.

The metering valve 204 may be downstream of the pump 202 and/or the flow filter 222. The metering valve 204 may be upstream of the pressure transducer 228, the pressure valve 206 fitted with dual channel inductive probe 207, the pull-down orifice 232, the shutoff valve 230, and/or the spill valve 208. Upon startup of the engine, the metering valve 204 may be set to a minimum flow. The minimum flow may be, for example, 200 pounds-per-hour (pph), however, the minimum flow may vary based on application application.

The pressure valve 206 may be any device capable of raising or controlling a pressure of the flow of fuel flowing to the combustion section 130 and/or burners. The pressure valve 206 may be, for example, any device capable of ensuring that fuel is delivered to the burners at or above a minimum pressure. The minimum pressure may be, for example, a pre-determined or set value. The pressure valve 206 may be, for example, a spring-loaded valve, where the spring exerts a pressure on the valve, closing off an orifice of the valve in fluid communication with the burners until the incoming fuel flow has a pressure great enough to compress the spring. The pressure valve 206 and/or the spring of the pressure valve may be set to open and allow fuel to flow to the burners once a pressure upstream of the valve 206 reaches a predetermined value. For example, the pressure valve 206 may start to open and start allowing fuel to the burners when the incremental closing of the secondary spill valve 210 causes the fuel pressure upstream of the pressure valve 206 to reach 200 psi, or 1350 kPa.

The pressure valve 206 may be, for example, a pressure raising and shutoff valve (PRSV). The pressure valve 206 may include an inductive probe 207, for example, to communicate the status and/or position of the pressure valve 206 to the controller 236, for example, a degree or amount of opening or closing of the pressure valve 206. For example, during startup of the engine, the inductive probe 207 may indicate to the controller 236 when the pressure valve 206 has cracked, begun to open, and/or reach a certain predetermined degree of opening due to the pressure of the fuel upstream of the valve 206 overcoming the pressure exerted on the valve 206 by the spring.

The pressure valve 206 may be in fluid communication with and/or downstream of the metering valve 204, and/or the pressure transducer 228. The pressure valve may be in fluid communication with and/or upstream of the pressure transducer 228, the combustion section 130, the burners, the shutoff valve 230, and/or the pump 202.

The spill valve 208 may be any device capable of spilling, rerouting, and/or absorbing a flow of excess fuel. For example, the spill valve 208 may reroute excess fuel flowing from the pump 202 back to inlet of the pump. The spill valve 208 may be, for example, a spring-loaded valve. The spill valve 208 may be a pressure drop spill valve (PDSV). When a flow of fuel from the pump 202 exceeds a pressure needed to overcome the spring, the spring may compress, opening the spill valve 208 and allowing a portion of the flow from the pump 202 to be diverted through the spill valve 208 instead of flowing to the metering valve 204.

The spill valve 208 may be in fluid communication with and/or downstream of the pump 202, and/or the flow filter 222. The spill valve 208 may be in communication with and/or upstream of the pump 202. Upon start up of the engine, the spill valve 208 may be completely closed.

The secondary spill valve 210 may be any device capable of spilling, rerouting, and/or absorbing a flow of excess fuel. For example, the secondary spill valve 210 may reroute excess fuel flowing from the pump 202 back to the inlet of the pump. The secondary spill valve 210 may be, for example, an electronically-operated hydraulic servo valve (EHSV). The controller 236 may send a signal to the secondary spill valve 210 to open or close the valve. For example, when the controller 236 determines an excess of fuel is being pumped by the pump 202 to the burners, the controller 236 may open the secondary spill valve 210 to prevent excess fuel from reaching the burners to mitigate an uncontrolled or uncommanded high thrust situation. An electrical signal sent to the secondary spill valve 210 may be proportional to the degree of opening of the valve 210, the position of the valve 210, and/or how much fuel is being spilled by the valve 210. For example, there may be a 1:1, or linear, relationship between the current being supplied to the secondary spill valve 210 and a degree of opening of the secondary spill valve 210. A certain amount of current may correspond a certain degree of opening of the secondary spill valve 210. A change in the supplied current may correspond to a proportional change to the opening or closing of the spill valve 210. The current supplied to the secondary spill valve 210 may, for example, be in the range of 50 mA. The position or degree of opening of the secondary spill valve 210 that corresponds to a specific amount of current may depend on the size and model of the secondary spill valve 210.

The secondary spill valve 210 may be in fluid communication with and/or downstream of the pump 202, and/or the flow filter 222. The secondary spill valve 210 may be in communication the pump 202. Upon engine start up, the secondary spill valve 210 may be fully or completely open. During the engine start up window, the secondary spill valve 210 may close in fixed increments and/or at a constant rate, which may increase the pressure of the fuel in the system 200. As the secondary spill valve 210 closes, the controller 236 may communicate and capture the position of the secondary spill valve 210, for example, a degree of closing of the secondary spill valve 210, when the pressure valve 206 cracks, opens, and/or reaches a set degree of opening. For example, the controller 236 may capture what current is being supplied to the spill valve 210, which controls the degree of opening of the spill valve 210.

The pressure transducer 228 may be any device capable of detecting and/or measuring the pressure difference across an inlet and an outlet of the pressure valve 206. The pressure transducer 228 may be downstream of the metering valve 204 and upstream of the burners. The pressure sensor 228 may be parallel with the pressure valve 206.

The shutoff valve 230 may be any device capable of closing or shutting off a flow of fuel. The shutoff valve 230 may be, for example, a solenoid valve. In a possible run-away scenario where where the engine needs to immediately be shut off, the solenoid in the shutoff valve 230 may be engaged to stop a flow of fuel through the FPMU 200 and to prevent stress on the other components of the FPMU 200.

The second pump 212 may be any device capable of increasing the pressure of the fuel to provide enough positive pressure to an inlet of the pump 202 to prevent, for example, cavitation. The second pump 212 may increase or boost the flue as it flows through the FPMU 200, for example, from an aircraft or fuel tanks upstream of the FPMU 200. The second pump 212 may be a boost pump. The second pump 212 may increase the pressure of the fuel, for example, to approximately 20-25 psi.

The fuel filter 214 may be any device capable of filtering out contaminates from the fuel flowing through the FPMU 200. For example, the filter 214 may filter out contaminated from an upstream fuel tank before the fuel flows to the pump 202 and other downstream components. The filter bypass valve 216 may be any device capable of opening and allowing a flow of unfiltered fuel to the pump 202 through a bypass conduit if the filter becomes clogged. The filter transducer 218 may be any device capable of alerting, for example, the controller 236 when the filter 214 becomes clogged.

The pressure relief valve 220 may be any device capable of opening by a pressure of the fuel reaching a certain point. For example, if a blockage or obstruction occurs in the FPMU 200 and the pressure downstream of the pump 202 is raised past a certain point, the relied valve 220 may open and allow a flow of fuel back to the inlet of the pump 202 in order to prevent over pressurization. The valve 220 may be set such that it will never open during normal operations of the FPMU 200, but will only open and allow flow back to the inlet of the pump 202 if the pressure rises beyond the set point.

The flow filter 222 may be any device capable of filtering out contaminants and debris. For example, the flow filter 222 may filter out contaminants or debris from the fuel coming out of the pump 202 before portions of it are routed to the servos in the secondary spill valve 210 and metering valve 224.

The pull down orifice 232 may be any device capable of dampening or regulating abrupt changes of flow through the FPMU 200. For example, the pull down orifice may be a simple plain orifice with a smaller diameter than the conduit in which it is disposed, or a device similar to a dashpot. The pull down orifice 232 may provide dynamic regulation function during shut off of the engine 100 or FPMU 200.

The backpressure orifice 234 any device capable of dampening or regulating abrupt changes of flow through the FPMU 200. For example, the back pressure orifice may be a simple plain orifice with a smaller diameter than the conduit in which it is disposed, or a device similar to a dashpot. The back pressure orifice 234 may provide damping to the FPMU 200 as the pressure valve 206 opens or closes. The back pressure orifice 234 may force the flow of fuel to squeeze through a small orifice to dampen or slow down the flow.

The controller 236 may be any device or circuitry capable of communicating with the system 200 components. The controller 236 may include a memory. The controller 236 may be a component within the FPMU 200, the FADEC, and/or may be a separate, external component.

During operation of the turbine engine 100, the FPMU 200 may regulate the fuel supplied by the airframe to the combustor 130. During start up of the turbine engine 100, for example, when the engine is first started after being off for a period of time the FPMU may be in a start up window. For example, a starter may bring the turbine engine 100 speed to a set value prior to ignition. The engine 100 speed may be held steady or constant for a few seconds during the start up window. During the start up window, the secondary spill valve 210 may be fully open, and as result, the primary spill valve 208 may be completely closed due to a low fuel pressure in its upstream. Additionally, the pressure valve 206 may be completely closed due to a low fuel pressure in its upstream.

During the start up window, the fuel may flow from the pump 202 to the metering valve 204. The metering valve 204 may open or close to a set degree based on a predetermined minimum flow. The metering valve 204 may be set to allow only a minimum flow to pass through the metering valve 204 towards the pressure valve 206. The metering valve 204 may have a specific degree of opening that corresponds to the minimum flow. The controller 236 may, for example, send an instruction to the metering servo valve 224 and the servo valve may open or close the metering valve 204 accordingly.

The fuel may flow through the metering valve 204 to the pressure valve 206. The pressure valve 206 may be closed upon the start up due to the pressure of the fuel flowing through the FPMU 200 being too low to overcome the force exerted on the valve by the valve spring. During the start up window, the controller 236 may close the secondary spill valve 210 at a constant rate and/or in set increments by sending a current to the secondary spill valve 210, wherein the current corresponds to a position and/or degree of opening or closing of the secondary spill valve 210. Additionally or alternatively, the controller 236 may change the current to close the secondary spill valve 210.

As the secondary spill valve 210 closes, this may cause the pressure of the fuel flowing through the FPMU 200 to rise. Once the pressure raises to be equal or greater than the predetermined pressure value, for example 200 psi, the pressure of the fuel may be strong enough to overcome the force exerted by the spring of the pressure valve 206. The pressure valve 206 may crack or begin to open and allow fuel to flow to the burners from the metering valve 204. The controller 236 may be able to detect when the pressure valve 206 cracks and/or reaches a specific position due to the inductive probe 207 connected to the pressure valve 206.

The controller 236 may capture the position and/or degree or opening or closing of the secondary spill valve 210 that corresponds to when the pressure valve 206 cracks and/or reaches a specific position. Additionally or alternatively, the controller 236 may capture the position, degree of opening or closing of the secondary spill valve 210, and/or the corresponding current being supplied to the secondary spill valve 201 that causes the pressure of the fuel in the FPMU 200 to raise enough to crack the pressure valve 206 or cause to pressure valve 206 to open to a specific position, for example, 10 mA. Additionally or alternatively, the controller 236 may capture the position, degree of opening or closing of the secondary spill valve 210, and/or the corresponding current being supplied to the secondary spill valve 210 that causes the pressure of the fuel to be equal to or greater than the predetermined pressure value.

Once the pressure valve 206 has cracked, the FPMU 200 may compete the start up process and begin operation for flight. The secondary spill valve 210 may continue to fully close, the primary spill valve 208 may open, the metering valve 204 may open enough to allow the fuel needed for operation to flow to the pressure valve 206, and the pressure valve may open enough to allow fuel at a required minimum pressure to flow to the burners.

The controller 236 may capture and store the position, degree of opening or closing of the secondary spill valve 210, and/or the corresponding current being supplied to the secondary spill valve 210 across a plurality of engine start up operations. The controller 236 may compare captured and stored position, degree of opening or closing of the secondary spill valve 210, and/or the corresponding current being supplied to the secondary spill valve 210 and determine whether there has been a change in the current and/or degree of opening required to raise the pressure of the fuel to be equal to or greater than the predetermined pressure value and/or crack the pressure valve 206. For example, upon deterioration of the FPMU 200 of a component such as the pump 202, the secondary spill valve 210 may have to be closed further or to a greater extent to increase the pressure of the fuel to the predetermined pressure value. When a change, which may indicate deterioration of the FPMU 200 is detected, the controller 236 may cause an alert or maintenance signal to turn on. For example, a predetermined threshold value may be set for the secondary spill valve 210 and when the secondary spill valve 210 must be closed to a point past the predetermined threshold value, the controller 236 may cause an alert or maintenance signal to turn on. Additionally or alternatively, the method describe herein could take place during shut down of the engine or another non-critical flight period. During shut down, for example, the controller 236 may capture a current or corresponding degree of opening or position of the secondary spill valve 210 that corresponds to when the pressure valve 206 closes instead of cracks.

Figure 3:
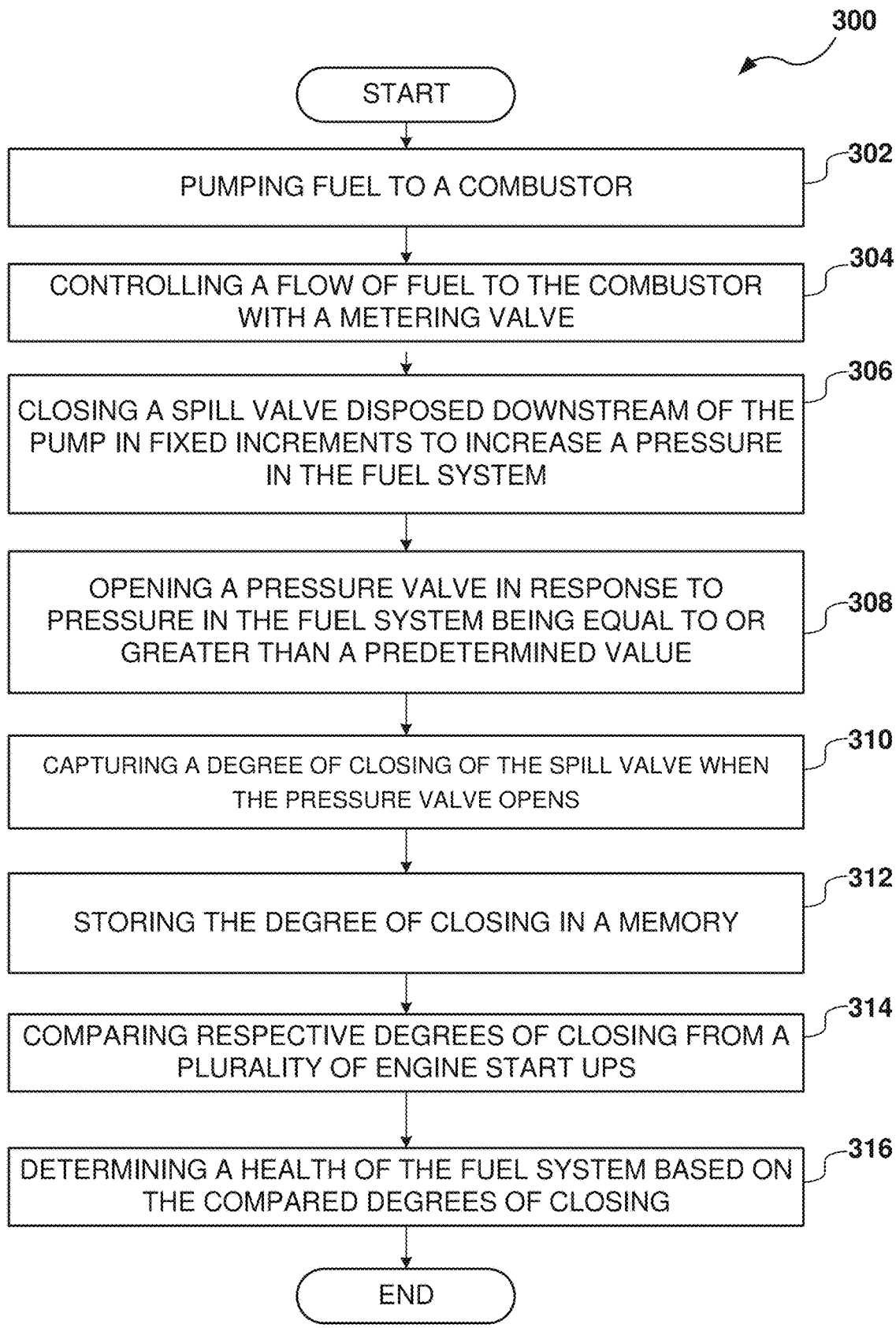
FIG. 3 illustrates an example method for monitoring the health of a fuel system.

FIG. 3 illustrates a flow diagram of an example of steps 300 to perform a FPMU health monitoring or check during the start of an engine. The pump 202 may pump the fuel to the combustion section 130 (302). The metering valve 204 may control a flow rate of the fuel flowing to the combustion section 130 (304). A secondary spill valve 310 disposed downstream of the pump 202 may be closed, for example via the controller 236, in fixed increments to increase a pressure of the fuel in the fuel system 200 (306).

The pressure valve 206 may open in response to the pressure in the fuel system 200 being equal to or greater than a predetermined value (308). A degree of closing of the spill valve 206 when the pressure valve 206 opens may be captured by the controller 236 (310). The captured degree of closing of the pressure valve 206 may be stored by the controller 236 in a memory (312). The controller 236 may compare captured and stored degrees of closings from a plurality of engine start ups or captured during engine start up windows (314). A health of the fuel system 200 may be determined based on the compared degrees of closing of the pressure valve 206 (316).

The steps may include additional, different, or fewer operations than illustrated in FIG. 3. The steps may be executed in a different order than illustrated in FIG. 3.

Figure 4:
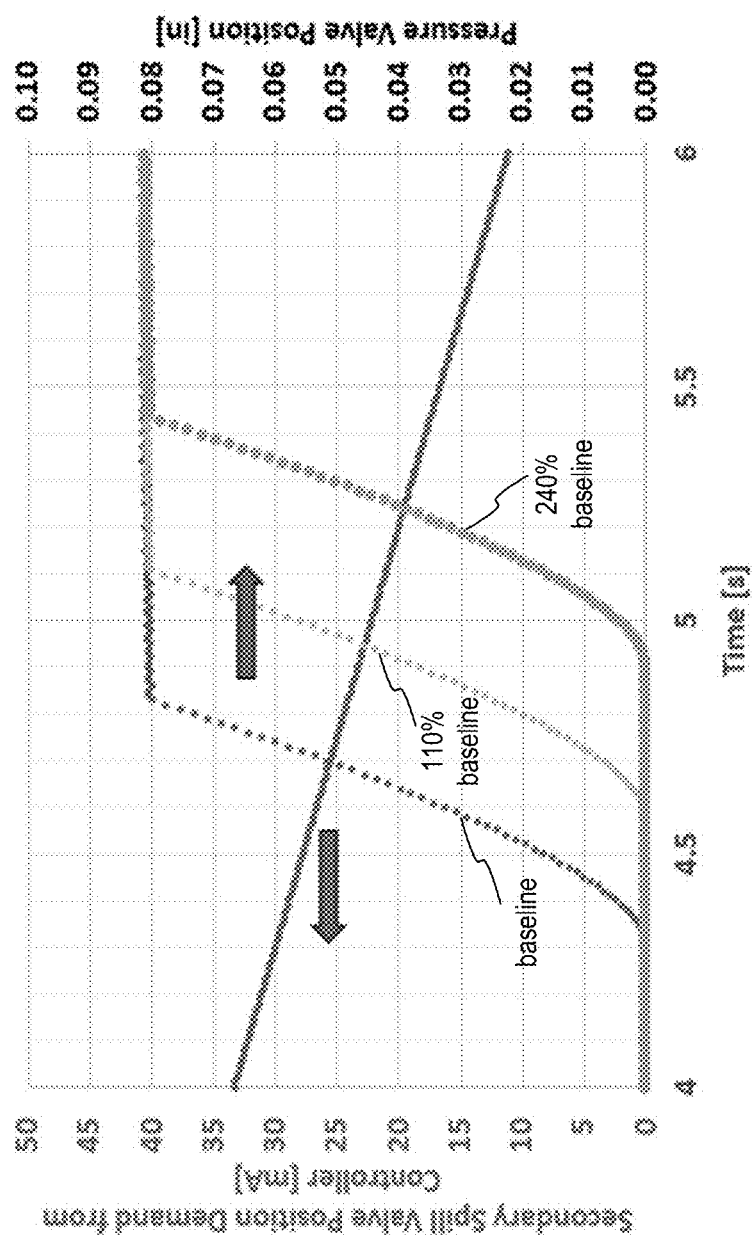
FIG. 4 illustrates a graph of an example of deterioration of a fuel system.

FIG. 4 illustrates a graph of an example of deterioration of a fuel system 200. The figure shows how the pressure valve 206 responds to closing of the secondary spill valve 210 under a constant engine speed and fuel demand. The secondary spill valve 210 is closing from a fully open position (50 mA for this example) to a fully closed position (0 mA) in a linear fashion in approximately 4.5 seconds. The graphed data sets correspond to three different scenarios of internal leakage at the pump 202, which is a common sign of pump deterioration: baseline (blue or left plot), 110% plus baseline (yellow or middle plot), and 240% plus baseline (gray or right plot). In FIG. 4, the secondary spill valve 210 starts to close from its 50 mA position at the 2.5 second mark. FIG. 4 illustrates that, as the internal leakage increases, the onset of pressure valve 206 movement is delayed. In other words, at a given time mark from the start of closing, the positions of the secondary spill valve differ, and they vary in a predictable way in relation to the degree of internal leakage or pump wear. This type of data may be, for example, used for trending or setting a threshold for alerting for deterioration of the system 200.

Each component may include additional, different, or fewer components. For example the valves may include additional controlling components such as servo valves. The controller 236 may comprise a memory and/or a processor. The FPMU 200 and/or turbine engine 100 may be implemented with additional, different, or fewer components. For example, the FPMU 200 may include additional or different pumps, valves, sensors, and/or probes. Additionally or alternatively, the FPMU 200 may, for example, not include certain components such as the pull down orifice 232, the back pressure orifice 234, one or more of the filters 214, 222, or other components of the FPMU 200.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of monitoring a fuel system in a gas turbine engine, the method comprising: pumping fuel to a combustor from a fuel tank with a pump; controlling a flow of the fuel to the combustor with a metering valve disposed downstream of the pump; closing a spill valve disposed downstream of the pump, wherein the spill valve is closed in fixed increments and closing the spill valve increases a pressure in the fuel system; opening a pressure valve in response to the pressure in the fuel system being equal to or greater than a predetermined value; and capturing a degree of closing of the spill valve when the pressure valve opens.

A second aspect relates to the method of aspect 1, wherein the method occurs during startup of a turbine engine.

A third aspect relates to the method of any preceding aspect further comprising storing and comparing, via a controller, the respective degree of closing of the spill valve when the pressure valve opens during a plurality of startups of the gas turbine to determine a health of the fuel system.

A fourth aspect relates to the method of any preceding aspect further comprising outputting, via the controller, a report of the health of the fuel system based on the comparison of the respective degree of closing of the spill valve across a plurality of startups.

A fifth aspect relates to the method of any preceding aspect wherein the step of pumping the fuel comprises pumping the fuel with a positive displacement pump.

A sixth aspect relates to the method of any preceding aspect wherein the fuel system comprises a fuel pump and metering system of a turbine engine.

A seventh aspect relates to the method of any preceding aspect wherein the spill valve is a secondary spill valve, the system further comprising a primary spill valve, wherein the primary spill valve is closed.

An eighth aspect relates to the method of any preceding aspect wherein the spill valve comprises an electro-hydraulic servo valve, the method further comprising controlling the degree of closing of the spill valve proportional to an amount of current supplied to the spill valve.

A ninth aspect relates to the method of any preceding aspect wherein the monitoring the degree of closing of the spill valve comprises monitoring the amount of current supplied to the spill valve when the pressure valve opens during an engine startup window.

A tenth aspect relates to the method of any preceding aspect wherein the pressure valve comprises a spring loaded pressure valve, the pressure valve configured to open at a pressure greater than 1350 kPa.

An eleventh aspect relates to the method of any preceding aspect further comprising controlling the flow of the fuel sent to the combustor with a metering valve disposed downstream of the pump.

A twelfth aspect relates to the method of any preceding aspect further comprising monitoring the degree of closing with a controller of the fuel system.

A thirteenth aspect relates to the method of any preceding aspect wherein the controller comprises a full authority digital engine control (FADEC) of a turbine engine.

A fourteenth aspect relates to the method of any preceding aspect further comprising predicting when the pump will fail or when a performance of the pump will decrease past a predetermined level of pumping performance.

A fifteenth aspect relates to a method of monitoring a fuel system, the method comprising: pumping fuel to a combustor from a fuel tank with a pump; controlling a flow of the fuel to the combustor with a metering valve disposed downstream of the pump; positioning a primary spill valve in a closed position, the primary spill valve disposed downstream of the pump; positioning a secondary spill valve in an open position, the secondary spill valve disposed downstream of the pump; closing the secondary spill valve in fixed increments, wherein closing the secondary spill valve increases a pressure in the fuel system; opening a pressure valve disposed downstream of the metering valve when the pressure in the fuel system reaches or exceeds a predetermined pressure value; and capturing a degree of closing of the secondary spill valve when the pressure valve opens.

A sixteenth aspect relates to the method of any preceding aspect further comprising comparing a respective degree of closing of the spill valve when the pressure valve opens during a plurality of startups of a turbine engine to determine a health of the fuel system.

A seventeenth aspect relates to the method of any preceding aspect further comprising comparing a respective degree of closing of the spill valve when the pressure valve opens during a plurality of startups of a turbine engine to determine a health of the pump.

An eighteenth aspect relates to the method of any preceding aspect wherein the spill valve comprises an electro-hydraulic servo valve, the method further comprising controlling the degree of closing of the spill valve proportional to an amount of current supplied to the spill valve.

A nineteenth aspect relates to the method of any preceding aspect wherein the monitoring the degree of closing of the spill valve comprises monitoring the amount of current supplied to the spill valve when the pressure valve opens.

A twentieth aspect relates to a method of monitoring a fuel system, the method comprising: pumping fuel to a combustor from a fuel tank with a pump at a startup of a gas turbine engine; controlling a flow of the fuel sent to the combustor with a metering valve disposed downstream of the pump; closing a spill valve disposed downstream of the pump, wherein the spill valve is closed in fixed increments and closing the spill valve increases a pressure in the fuel system; opening a pressure valve when the pressure in the fuel system equals or exceeds a predetermined pressure value; monitoring a degree of closing of the spill valve required to increase the pressure of the system to the predetermined pressure value; storing the degree of closing required in a memory; comparing respective degrees of closing from a plurality of engine startups over a period of time; determining a health of the pump based on the compared degrees of closing.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of monitoring a fuel system in a gas turbine engine, the method comprising:
    pumping fuel to a combustor from a fuel tank with a pump;
    controlling a flow of the fuel to the combustor with a metering valve disposed downstream of the pump;
    closing a spill valve disposed downstream of the pump, wherein the spill valve is closed in fixed increments and closing the spill valve increases a pressure in the fuel system;
    opening a pressure valve in response to the pressure in the fuel system being equal to or greater than a predetermined value;
    capturing a degree of closing of the spill valve when the pressure valve opens; and
    storing and comparing, via a controller, the respective degree of closing of the spill valve when the pressure valve opens during a plurality of startups of the gas turbine to determine a health of the fuel system or the pump.

2. The method of claim 1 further comprising outputting, via the controller, a report of the health of the fuel system based on the comparison of the respective degree of closing of the spill valve across the plurality of startups.

3. The method of claim 1 wherein the step of pumping the fuel comprises pumping the fuel with a positive displacement pump.

4. The method of claim 1 wherein the spill valve is a secondary spill valve, the system further comprising a primary spill valve, wherein the primary spill valve is closed.

5. The method of claim 1 wherein the spill valve comprises an electro-hydraulic servo valve, the method further comprising controlling the degree of closing of the spill valve proportional to an amount of current supplied to the spill valve.

6. The method of claim 5 wherein the monitoring the degree of closing of the spill valve comprises monitoring the amount of current supplied to the spill valve when the pressure valve opens during an engine startup window.

7. The method of claim 1 wherein the pressure valve comprises a spring loaded pressure valve, the pressure valve configured to open at a pressure greater than 1350 kPa.

8. The method of claim 1 further comprising monitoring the degree of closing with a controller of the fuel system.

9. The method of claim 1 wherein the controller comprises a full authority digital engine control (FADEC) of a turbine engine.

10. A method of monitoring a fuel system, the method comprising:
    pumping fuel to a combustor from a fuel tank with a pump;
    controlling a flow of the fuel to the combustor with a metering valve disposed downstream of the pump;
    positioning a primary spill valve in a closed position, the primary spill valve disposed downstream of the pump;
    positioning a secondary spill valve in an open position, the secondary spill valve disposed downstream of the pump, wherein the secondary spill valve comprises an electro-hydraulic servo valve;
    closing the secondary spill valve in fixed increments, wherein closing the secondary spill valve increases a pressure in the fuel system, wherein closing the secondary spill valve comprises controlling a degree of closing of the secondary spill valve proportional to an amount of current supplied to the spill valve;
    opening a pressure valve disposed downstream of the metering valve when the pressure in the fuel system reaches or exceeds a predetermined pressure value; and
    capturing a degree of closing of the secondary spill valve when the pressure valve opens.

11. The method of claim 10 further comprising comparing a respective degree of closing of the secondary spill valve when the pressure valve opens during a plurality of startups of a turbine engine to determine a health of the fuel system.

12. The method of claim 10 further comprising comparing a respective degree of closing of the secondary spill valve when the pressure valve opens during a plurality of startups of a turbine engine to determine a health of the pump.

13. The method of claim 10 wherein the monitoring the degree of closing of the secondary spill valve comprises monitoring the amount of current supplied to the secondary spill valve when the pressure valve opens.

14. A method of monitoring a fuel system, the method comprising:
    pumping fuel to a combustor from a fuel tank with a pump at a startup of a gas turbine engine;
    controlling a flow of the fuel sent to the combustor with a metering valve disposed downstream of the pump;
    closing a spill valve disposed downstream of the pump, wherein the spill valve is closed in fixed increments and closing the spill valve increases a pressure in the fuel system;
    opening a pressure valve when the pressure in the fuel system equals or exceeds a predetermined pressure value;

monitoring a degree of closing of the spill valve required to increase the pressure of the system to the predetermined pressure value;
storing the degree of closing required in a memory;
comparing respective degrees of closing from a plurality of engine startups over a period of time; and
determining a health of the pump based on the compared degrees of closing.

* * * * *